(12) United States Patent  
Peterson et al.

(10) Patent No.: US 12,381,844 B2
(45) Date of Patent: Aug. 5, 2025

(54) METHODS AND APPARATUS TO DECREASE DOMAIN NAME SYSTEM (DNS) LOOKUP TIME FOR AIRBORNE CLIENTS (71) Applicant: GOGO BUSINESS AVIATION LLC, Broomfield, CO (US)

(72) Inventors: James S. Peterson, Elburn, IL (US); Bryan Adrian Lauer, Chicago, IL (US); Lam Ping To, Chicago, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 0 days.

(21) Appl. No.: 17/797,896

(22) PCT Filed: Dec. 21, 2020

(86) PCT No.: PCT/US2020/066290
§ 371 (c)(1),
(2) Date: Aug. 5, 2022

(87) PCT Pub. No.: WO2021/158304
PCT Pub. Date: Aug. 12, 2021

(65) Prior Publication Data
US 2023/0179565 A1 Jun. 8, 2023

Related U.S. Application Data (60) Provisional application No. 62/970,443, filed on Feb. 5, 2020.

(51) Int. Cl.
*G06F 15/16* (2006.01)
*H04L 61/4511* (2022.01)
(Continued)

(52) U.S. Cl.
CPC ...... *H04L 61/4511* (2022.05); *H04L 61/4552* (2022.05); *H04L 61/58* (2022.05); *H04W 4/06* (2013.01); *H04W 84/06* (2013.01)

(58) Field of Classification Search
CPC ... H04L 61/4511; H04L 61/58; H04L 61/4552
See application file for complete search history.

(56) References Cited

U.S. PATENT DOCUMENTS

| 9,172,739 | B2 * | 10/2015 | Berman | H04L 67/02 |
| 9,225,794 | B2 * | 12/2015 | Roskind | G06F 16/95 |
| 9,749,336 | B1 * | 8/2017 | Zhang | H04L 63/14 |
| 10,375,016 | B1 * | 8/2019 | Vavrusa | H04L 12/18 |

(Continued)

OTHER PUBLICATIONS

International Search Report and Written Opinion for Application No. PCT/US2020/066290 dated Apr. 1, 2021.
(Continued)

*Primary Examiner* — Duyen M Doan
(74) *Attorney, Agent, or Firm* — Holland & Hart LLP (57) ABSTRACT

Methods and apparatus to decrease DNS lookup times for mobile clients are disclosed. An example DNS cache peering system includes a mobile DNS cache; a mobile DNS server configured to, when an IP address for a URL is not found in the DNS cache, send a DNS lookup request for the URL; a ground-based DNS server to receive the DNS lookup request from the mobile DNS server, and send, in response, a DNS lookup response including the IP address for the URL to the mobile DNS server; and a ground-based DNS peer engine server configured to capture the DNS lookup response, and multicast DNS information from the DNS lookup response to a plurality of mobile DNS peer engine clients, wherein the plurality of mobile DNS peer engine clients are configured to store the DNS information in respective ones of a plurality of mobile DNS caches.

19 Claims, 6 Drawing Sheets

(51) Int. Cl.
*H04L 61/4552* (2022.01)
*H04L 61/58* (2022.01)
*H04W 4/06* (2009.01)
*H04W 84/06* (2009.01)

(56) References Cited

U.S. PATENT DOCUMENTS

| | | | |
|---|---|---|---|
| 10,666,672 B2* | 5/2020 | Arnell | H04L 12/22 |
| 10,812,442 B1* | 10/2020 | Gray | H04L 67/563 |
| 10,936,696 B2* | 3/2021 | Contreras | G06F 16/2228 |
| 11,012,467 B2* | 5/2021 | Maslak | H04L 63/1425 |
| 11,108,788 B1* | 8/2021 | Dixon | H04L 63/1416 |
| 2013/0204978 A1 | 8/2013 | Fleischman et al. | |

OTHER PUBLICATIONS

Sundaresan et al, "Accelerating last-mile web performance with popularity-based prefetching", Applications, Technologies, Architectures, and Protocols for Computer Communication, ACM, 2 Penn Plaza, Suite 701 New York NY 10121-0701 USA, Aug. 13, 2012 (Aug. 13, 2012), pp. 303-304.

European Patent Application No. 20842833.4, Examination Report, dated Jun. 25, 2024.

Mitchell, What is a DNS Cache and How Does It Work? Retrieved from the internet at: <URL:https://web.archive.org/web20200119132955/https://www.lifewire.com/what-is-a-dns-cache-817514> (2019).

* cited by examiner

METHODS AND APPARATUS TO DECREASE DOMAIN NAME SYSTEM (DNS) LOOKUP TIME FOR AIRBORNE CLIENTS

CROSS-REFERENCE TO RELATED APPLICATIONS

This application is a National Stage application of International Application No. PCT/US2020/066290, entitled "Methods and Apparatus to Decrease Domain Name System (DNS) Lookup Times for Airborne Clients," filed Dec. 21, 2020 which claims the benefit of U.S. Provisional Patent Application No. 62/970,443, entitled "Methods and Apparatus to Decrease Domain Name System (DNS) Lookup Times for Airborne Clients," filed Feb. 5, 2020, which are expressly incorporated by reference herein in their entirety.

FIELD OF THE DISCLOSURE

This disclosure relates generally to domain name system (DNS) lookup times for airborne clients, and, more particularly, to methods and apparatus to decrease DNS lookup times for mobile clients, such as airborne clients.

BACKGROUND

Airborne clients, such as a user device used by a passenger of a commercial aircraft, may use geosynchronous satellites and air-to-ground (ATG) uplink technologies to connect an airborne client to a ground-based resource. Such communications may have relatively large round trip times (RTT) that may affect the performance of airborne services. For example, the performance of DNS services, which may require that a DNS lookup request be sent over-the-air (OTA) to a ground-based DNS server and a DNS lookup response be received back OTA from the ground-based DNS server, can be strongly affected by RTT, causing slower response times for clients to load services.

The figures depict examples of this disclosure for purposes of illustration only. One skilled in the art will readily recognize from the following discussion that alternate embodiments of the apparatus and methods illustrated herein may be employed without departing from the principles set forth herein.

In general, the same reference numbers will be used throughout the drawing(s) and accompanying written description to refer to the same or like parts. The figures are not to scale. Connecting lines or connectors shown in the various figures presented are intended to represent example functional relationships and/or physical or logical couplings between the various elements.

DETAILED DESCRIPTION

Web browsing, as well as applications that have browser-like behavior(s), may be strongly affected by RTT because of their reliance on DNS services. In an example OTA system a transmission speed of 50 or more megabits per second (Mbps) is provided, which is faster than most home Internet services. However, even with an RTT of 1 second in an OTA system, page load times can degrade to, for example, 15-to-30 seconds, versus 5 seconds in the lower RTT environment of most homes.

Additionally, DNS cache time-to-live (TTL) values are shrinking for many services, particularly services hosted in content delivery network (CDN) environments. Smaller TTL values result in shorter caching periods on airborne DNS servers and less cache hits on the airborne DNS servers, thus, increasing the number of DNS lookups over the larger RTT OTA link.

Finally, airborne DNS servers only observe and cache DNS lookup requests for a small number of local clients. In contrast, an example ground-based DNS server observes and caches DNS lookup requests for 1000's of aircraft and 10's of thousands of clients. Thus, the ground-based DNS caches will be more current and have a much higher hit ratio than airborne DNS caches even with shorter DNS TTL and CDN usage.

While an airborne DNS cache can be peered with a ground-based DNS cache, doing so can be bandwidth intensive, it needs to be intelligent to reduce redundancy, and caches need to be of nearly equal size and depth (which may not be practical for an airborne DNS cache).

To reduce or eliminate some or all of these, or other problems of DNS lookups for mobile clients (e.g., airborne clients, ground-to-ground communication systems, ship-to-shore communication systems, etc.) in OTA systems, example methods and apparatus to decrease DNS lookup times for airborne clients are disclosed herein. While examples disclosed herein refer to airborne clients for clarity, it should be understood that aspects disclosed herein are applicable to other communication technologies that encounter large RTT for during DNS look ups. For example, ground-to-ground communication systems, ship-to-shore communication systems, etc.

Reference will now be made in detail to non-limiting examples, some of which are illustrated in the accompanying drawings.

Figure 1:
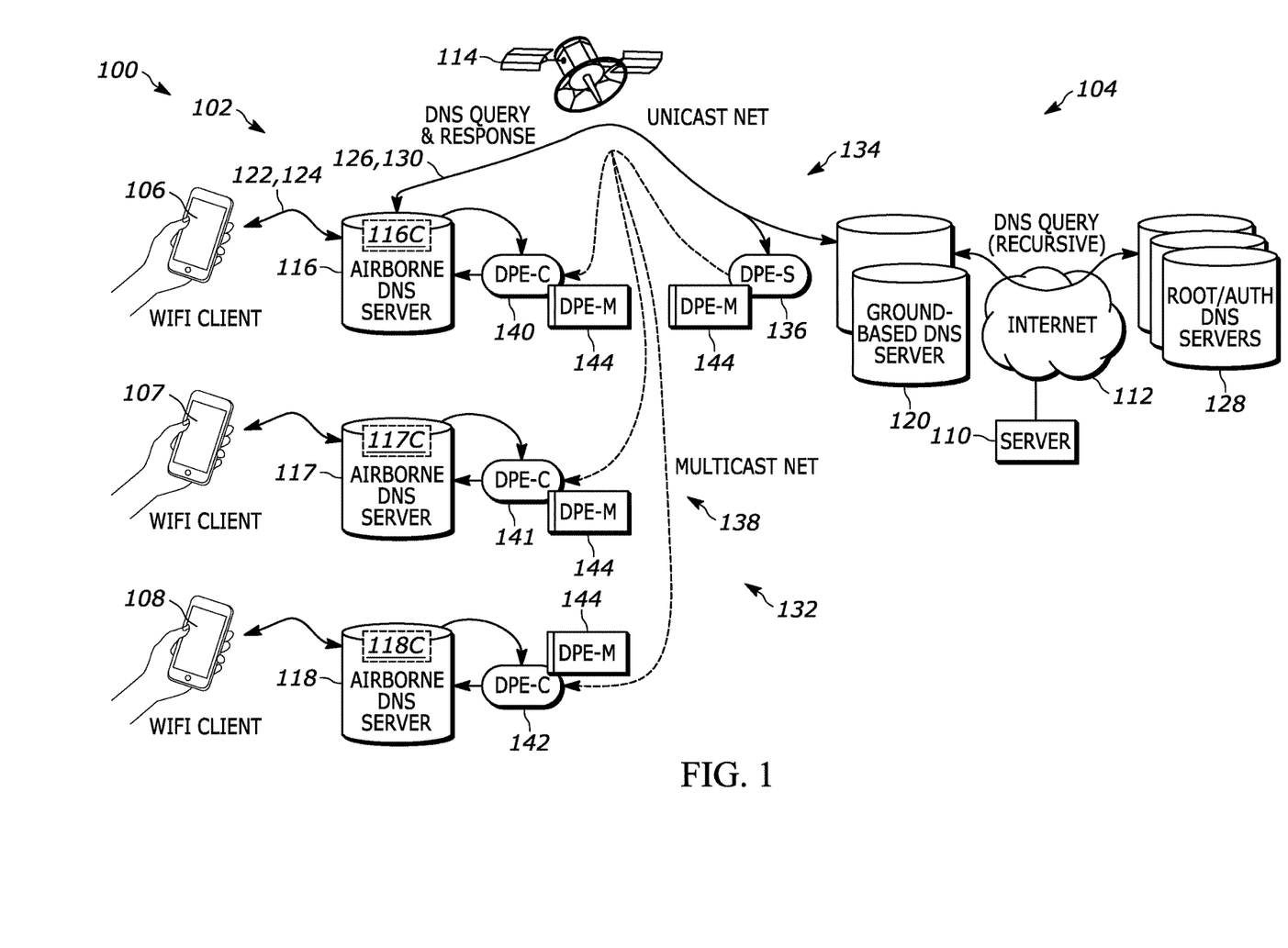
FIG. 1 illustrates an example communication system constructed in accordance with aspects this disclosure.

FIG. 1 is a schematic illustration of an example communication system 100 configured to decrease DNS lookup times for airborne clients in OTA systems, in accordance with aspects of this disclosure. For clarity of illustration and conciseness of discussion, the illustrated example of FIG. 1 is principally focused on aspects of the communication system 100 related to DNS services. It will be readily understood by those of ordinary skill in the art that the communication system 100 will, in practice, have an arrangement of one or more of any type(s) of elements, processors, servers, storage devices, devices, etc. related to transmitting, receiving, processing, etc. of data (e.g., information, media content, web content, etc.) into, out of, and through the communication system 100.

The communication system 100 includes an example OTA portion 102 and an example ground-based portion 104. The communication system 100 provides communication services between any number and/or any type(s) of airborne user devices (three of which are designated at reference numerals 106, 107 and 108) and any number and/or type(s) of ground-based servers (one of which is designated at reference numeral 110) coupled to The Internet 112 via a geosynchronous satellite 114. The user devices 106-108 may also be provided services by one or more airborne servers (not shown in the example of FIG. 1). Example user devices 106-108 include a mobile device (e.g., a cell phone, a smart phone, a tablet such as an IPAD™), a personal digital assistant (PDA), an Internet appliance, a digital versatile disk (DVD) player, a compact disc (CD) player, a Blu-ray disk player, a digital video recorder, a Blu-ray player, a gaming console, a personal video recorder, a set top box, a headset or other wearable device, or any other type of computing device.

To perform DNS lookups (e.g., queries), the OTA portion 102 includes a plurality of airborne DNS servers 116, 117 and 118 having respective DNS caches 116C, 117C and 118C, and the ground portion 104 includes one or more ground-based DNS servers (one of which is designated at reference numeral 120). In the illustrated example, the user devices 106-108 are associated with respective ones of the airborne DNS servers 116-118. However, other numbers of user devices 106-108 may be associated with any of the airborne DNS servers 116-118. The user devices 106-108 and the airborne DNS servers 116-118 may be associated with any number(s) of aircraft.

When, for example, the user device 106 needs an Internet Protocol (IP) address for a uniform resource locator (URL) for a website to which an application on the user device 106 (e.g., a web browser) intends to communicate, the user device 106 sends a DNS lookup request message 122 to its associated airborne DNS server 116. If the DNS cache 116C of the airborne DNS server 116 stores the IP address for the URL, the airborne DNS server 116 sends a DNS lookup response message 124 containing the IP address to the user device 106. If the DNS cache 116C of airborne DNS server 116 does not store the IP address for the URL, the airborne DNS server 116 sends a unicast DNS lookup request message 126 containing the URL to the ground-based DNS server(s) 120. The ground-based DNS server(s) 120 query their DNS caches and/or, if necessary, an authoritative name server 128 for the IP address for the URL. A unicast DNS lookup response message 130 containing the IP address for the URL is sent to the airborne DNS server 116 and subsequently to the user device 106.

To improve DNS cache efficiency (e.g., to decrease DNS lookup times), the communication system 100 includes an intelligent DNS cache peering system 132 between the ground-based DNS servers 120 and the airborne DNS servers 116-118. To send peering information, a first portion 134 of the DNS cache peering system 132 included in the ground-based portion 104 has one or more ground-based DNS peer engine servers (DPE-S) 136. To receive peering information, a second portion 138 of the DNS cache peering system 132 included in the OTA portion 102 has one or more airborne DNS peer engine clients (DPE-C) 140, 141 and 142 configured as multicast addresses and/or endpoints.

The ground-based DPE-S(s) 136 listen to DNS lookup responses 130 from the ground-based DNS server(s) 120 before, as, after, etc. they are sent (e.g., transmitted, queued, unicast, etc.). The ground-based DPE-S(s) 136 package content from one or more DNS lookup responses 130 into a DNS peer engine message (DPE-M) 144, and multicasts the DPE-M 144 to the airborne DPE-Cs 140-142. For higher efficiency, the DNS peering information is sent using multicast transmissions. However, unicast transmissions may be used, albeit with increased bandwidth usage. Each of the airborne DPE-Cs 140-142 receive the DPE-M(s) 144 from the ground-based DPE-S(s) 136 and the content of the DPE-M(s) 144 is cached in its associated DNS cache 116C-118C Additionally and/or alternatively, the airborne DNS server 116-118 can proxy client DNS lookup requests 122 through its DPE-C 140-142, which can operate as a DNS proxy. In such instances, the airborne DNS server 116-118 and the DPE-C 140-142 implement a two stage cache and, when needed, the DPE-C 140-142 sends the DNS lookup request 122 OTA to the ground-based DNS server(s) 120. Additionally and/or alternatively, the airborne DNS server 116-118 upon DNS lookup failure with a fast timeout, sends the request OTA DNS lookup request 122. Thereby, a DNS cache (e.g., for a timeframe, a time period, a size, etc.) for each airborne DNS server 116-118 representing DNS lookup responses 130 sent by the ground-based DNS server(s) 120 to any of the airborne DNS servers 116-118 is formed for the user devices 106-108 to subsequently utilize.

Such peering advantageously benefits from the likelihood that multiple users will access the same URL. That is, when a first user device 106-108 accesses a URL it is likely that another user device 106-108 will subsequently access the URL. Thus, a subsequent DNS lookup request 122 for that URL sent to any of the airborne DNS servers 116-118 is more likely to be found in their airborne DNS cache 116C-118C, thereby decreasing the need for OTA DNS lookup requests and the ensuing RTT. For example, average DNS lookup time may decrease from 1000 milliseconds (msec) to 10 msec. Accordingly, web page load time (PLT) performance is improved (e.g., by 2×-to-5×, or a 10 second PLT versus 30 second PLT). In fact, in some instances, web PLT improves on average as network utilization increases.

In some examples, the sending of a DPE-M 144 is triggered by the end of a period of time, a timer, a service loop, a volume-based trigger, etc. In some examples, an interface between the DPE-S(s) 136 and the DPE-Cs 140-142 is proprietary and/or secure. The URL and IP address information may be compressed and/or hashed for efficiency. The transfer mechanism can be file, message, file system sync, etc. to additionally and/or alternatively increase efficiency.

In some examples, the DNS request responses 130 having higher associated TTLs, higher frequency of request, etc. are peered before responses 130 having lower associated TTLs. In some examples, TTL values are increased to improve airborne DNS caching efficiency, albeit by possibly not fully adhering to Internet rules governing DNS caching. Additionally and/or alternatively, the system can revalidate the DNS result before DNS TTL expiration and multicast the latest DNS result to airborne distributed cache servers without violating DNS cache rule.

In an example, the DPE-Cs 140-142 connect with the DPE-S(s) 136 via a selective acknowledgement (SACK) mechanism, and with sufficient modulation and coding (modcod) and forward error correction (FEC) for system resiliency. In an example, a 500 kbps multicast network is utilized. It has been advantageously discovered that as the network traffic increases the DNS traffic from aircraft to ground-based servers decreases through use of the peering system 132 disclosed herein. Thus, a global 500 Kbps investment for peering results in lower overall network DNS usage. In some instances, to reduce network traffic for peering, the peering of DNS information for sites with larger TTLs (e.g., TTL>60, domains w/less timing dependency such as real-time entertainment domains/services (Netflix, YouTube, HBO, etc.) is not carried out.

In some examples, DNS lookup responses from one service provider may be captured and used to provide DNS cache information for users of another service provider. Likewise, the DNS caches on a current idle plane can receive updates based on users of other planes.

While an example manner of implementing the DNS cache peering system 132 and/or, more generally, the communication system 100 to decrease DNS lookup times for airborne clients are illustrated in FIG. 1, one or more of the elements, processes and/or devices illustrated in FIG. 1 may be combined, divided, re-arranged, omitted, eliminated and/or implemented in any other way. Further, the DNS cache peering system 132 and/or, more generally, the communication system 100 may include one or more elements, processes or devices in addition to, or instead of, those illustrated in FIG. 1, or may include more than one of any or all of the illustrated elements, processes and devices.

The DPE-S 132, the DPE-Cs 140-142 and/or, more generally, the DNS cache peering system 132 of FIG. 1 may be implemented by hardware, software, firmware, and/or any combination of hardware, software and/or firmware. Thus, for example, any of the DPE-S 132, the DPE-Cs 140-142 and/or, more generally, the DNS cache peering system 132 of FIG. 1 could be implemented by a computing system such as that shown and discussed below in connection with FIG. 7, one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate array(s) (FPGA(s)), and/or field programmable logic device(s) (FPLD(s)).

As used herein, the phrase "in communication," including variations thereof, encompasses direct communication and/or indirect communication through one or more intermediary components, and does not require direct physical (e.g., wired) communication and/or constant communication, but rather additionally includes wireless communication and selective communication at periodic intervals, scheduled intervals, aperiodic intervals, and/or one-time events.

Figure 2:
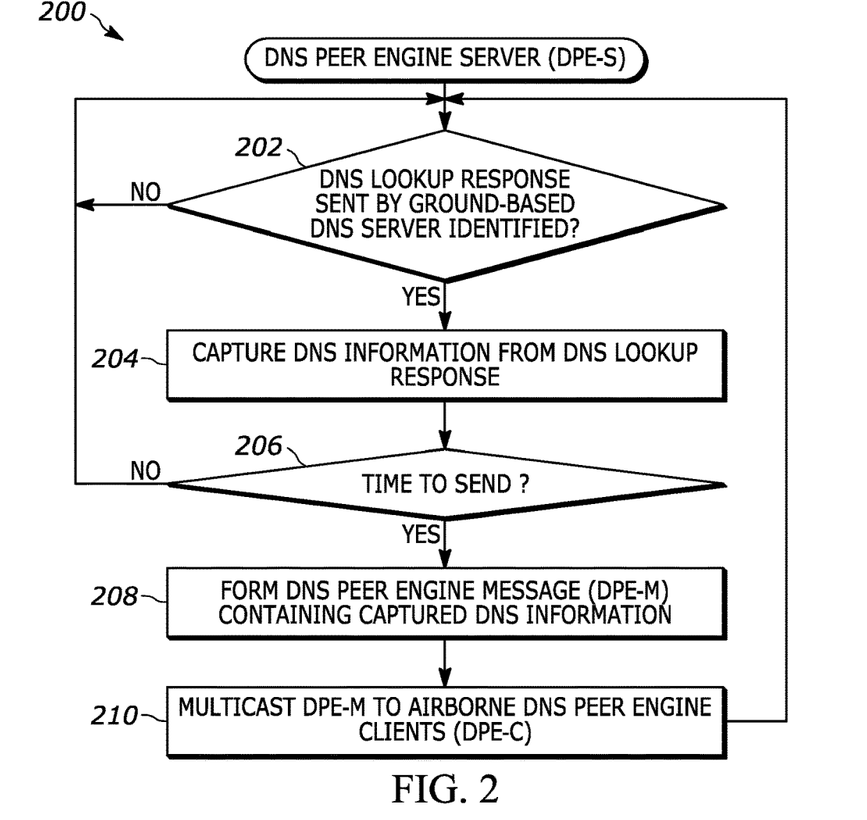
FIG. 2 is a flowchart representative of example methods, logic or instructions for implementing the example DNS peer engine server of FIG. 1.

A flowchart 200 representative of example processes, methods, logic, software, computer- or machine-readable instructions for implementing the DPE-S(s) 136 is shown in FIG. 2. The processes, methods, logic, software and instructions may be an executable program or portion of an executable program for execution by a processor such as the processor 702 of FIG. 7. The program may be embodied in software or instructions stored on a non-transitory computer- or machine-readable storage device, storage medium and/or storage disk such as a memory, a CD, a compact disc read-only memory (CD-ROM), a hard drive, a solid state drive (SSD), a DVD, a Blu-ray disk, a cache, a flash memory, a read-only memory (ROM), a random access memory (RAM), or any other storage device or storage disk associated with the processor 702 in which information is stored for any duration (e.g., for extended time periods, permanently, for brief instances, for temporarily buffering, and/or for caching of the information). As used herein, the term non-transitory computer- or machine-readable medium is expressly defined to include any type of computer-readable storage device, storage medium and/or storage disk and to exclude propagating signals and to exclude transmission media. Further, although the example program is described with reference to the flowchart 200 illustrated in FIG. 2, many other methods of implementing the DPE-S 136 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an ASIC, a PLD, an FPGA, an FPLD, a logic circuit, hardware logic, hardware implemented state machines, etc.) structured to perform the corresponding operation without executing software or instructions.

The program of FIG. 2 begins at block 202, where a DPE-S 136 waits for a DNS lookup response message 130 to be sent by a ground-based DNS server 120 to an airborne DNS server 116-118 (block 202). When a DNS lookup response message 130 is identified (block 202), the DPE-S 136 captures the DNS information from the captured DNS lookup response message 130 (block 204). When it is time to send peered DNS information (e.g., when triggered by a timer, as part of a service loop, a volume-based trigger, etc.) (block 206), the DPE-S 136 forms a DPE-M 144 based on the captured DNS information (block 208) and multicasts the DPE-M 144 to the DPE-Cs 140-142 (block 210). Control returns to block 202 to continue identifying and capturing DNS lookup information.

Figure 3:
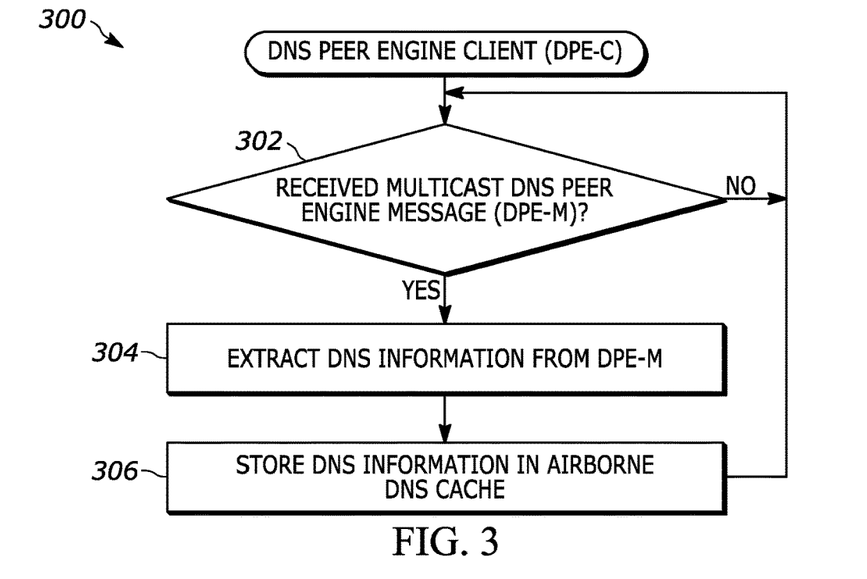
FIG. 3 is a flowchart representative of example methods, logic or instructions for implementing the example DNS peer engine client of FIG. 1.

A flowchart 300 representative of example processes, methods, logic, software, computer- or machine-readable instructions for implementing the DPE-C(s) 140-142 is shown in FIG. 3. The processes, methods, logic, software and instructions may be an executable program or portion of an executable program for execution by a processor such as the processor 702 of FIG. 7. The program may be embodied in software or instructions stored on a non-transitory computer- or machine-readable storage device, storage medium and/or storage disk such as those described above in connection with FIG. 2. Further, although the example program is described with reference to the flowchart 300 illustrated in FIG. 3, many other methods of implementing the DPE-C(s) 140-142 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an ASIC, a PLD, an FPGA, an FPLD, a logic circuit, hardware logic, hardware implemented state machines, etc.) structured to perform the corresponding operation without executing software or instructions.

The program of FIG. 3 begins at block 302, where a DPE-C 140-142 waits to receive a DPE-M 144 from a DPE-S 136 (block 302). The DPE-C 140-142 extracts DNS information from the received DPE-M 144 (block 304) and stores the extracted DNS information in its associated airborne DNS cache 116C-118C (block 306). Control then returns to block 302 to wait for another DPE-M 144.

Figure 4:
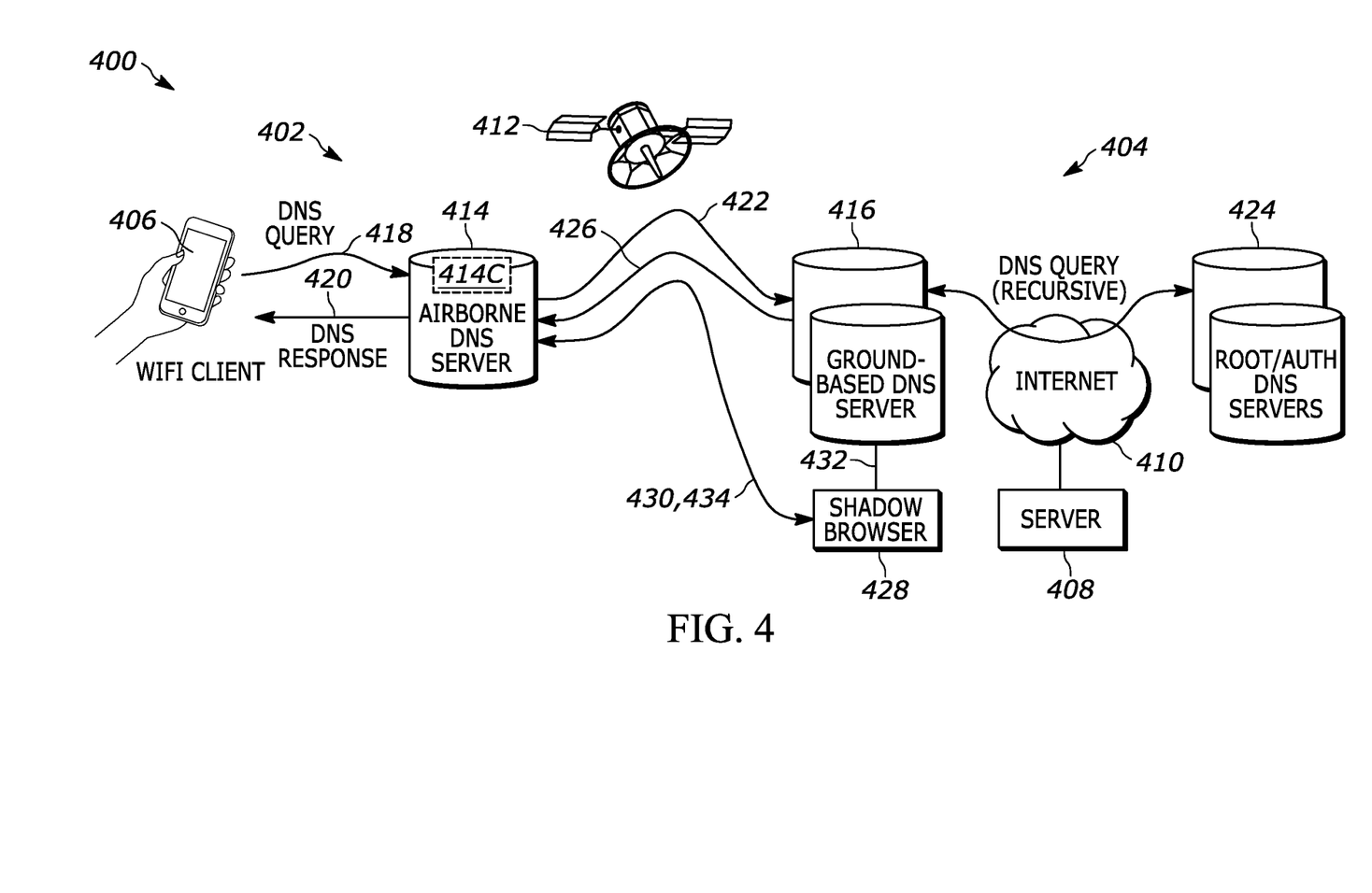
FIG. 4 illustrates another example communication system constructed in accordance with aspects this disclosure.

FIG. 4 is a schematic illustration of another example communication system 400 configured to decrease DNS lookup times for airborne clients in OTA systems, in accordance with aspects of this disclosure. For clarity of illustration and conciseness of discussion, the illustrated example of FIG. 4 is principally focused on aspects of the communication system 400 related to DNS services. It will be readily understood by those of ordinary skill in the art that the communication system 400 will, in practice, have an arrangement of one or more of any type(s) of elements, processors, servers, storage devices, devices, etc. related to transmitting, receiving, processing, etc. of data (e.g., information, media content, web content, etc.) into, out of, and through the communication system 400. The communication system 400 includes an example OTA portion 402 and an example ground-based portion 404.

The communication system 400 provides communication services between any number and/or any type(s) of airborne user devices (one of which is designated at reference numerals 406) and any number and/or type(s) of ground-based servers (one of which is designated at reference numeral 408) coupled to The Internet 410 via a geosynchronous satellite 412. The user device 406 may also be provided services by one or more airborne servers (not shown in the example of FIG. 4). Example user devices 406 include a mobile device (e.g., a cell phone, a smart phone, a tablet such as an IPAD™), a PDA, an Internet appliance, a DVD player, a CD player, a digital video recorder, a Blu-ray player, a gaming console, a personal video recorder, a set top box, a headset or other wearable device, or any other type of computing device To perform DNS lookups (e.g., queries), the OTA portion 402 includes a plurality of airborne DNS servers (one of which is designated at reference numeral 414) for respective aircraft, and the ground portion 404 includes one or more ground-based DNS servers (one of which is designated at reference numeral 416). In the illustrated example, the user device 406 is associated with the airborne DNS server 414. Other user devices may be associated with the airborne DNS server 414 and/or other airborne DNS servers. User devices and airborne DNS servers may be associated with any number(s) of aircraft in any way(s).

When, for example, the user device 406 needs an IP address for a website identified by a URL to which an application on the user device 406 intends to communicate, the user device 406 sends a DNS lookup request message 418 to its associated airborne DNS server 414. If a DNS cache 414C of the airborne DNS server 414 contains the IP address for the URL, the airborne DNS server 414 sends a DNS lookup response message 420 containing the IP address to the user device 406. If the DNS cache 414C of airborne DNS server 414 does not store the IP address for the URL, the airborne DNS server 414 sends a DNS lookup request message 422 containing the URL to the ground-based DNS server(s) 416. The ground-based DNS server(s) 416 query their DNS caches and/or, if necessary, query an authoritative name server 424 for the IP address for the URL. A DNS lookup response message 426 containing the identified IP address for the URL is sent to the airborne DNS server 414 and subsequently to the user device 406.

To improve DNS cache efficiency (e.g., to decrease DNS lookup times), the ground-based portion 404 includes an example ground-based shadow browser 428. When the DNS cache of the airborne DNS server 414 does not include the IP address for the URL, the airborne DNS server 414 sends a message 430 including the URL to the shadow browser 428. In some examples, the airborne DNS server 414 sends the message 430 to the shadow browser 418 in addition to sending the DNS lookup query 422 to the ground-based DNS server 416. In some examples, the ground-based DNS server 416 and the shadow browser 428 process the URL in parallel. For example, the ground-based DNS server 416 identifies the IP address for the URL and returns the IP address to the airborne DNS server 414 in the DNS lookup response message 426. The user device 406 can, based on the IP address provided by the ground-based DNS server, begin obtaining services for the URL. Subsequent URLs identified from the IP address would undergo a similar DNS lookup query process.

In parallel, wholly or partially, the shadow browser 428 processes the website(s) identified by the URL. The shadow browser 428 builds and traverses the document object model (DOM) for the page pointed to by the URL as an initial URL to discover any additional URLs referenced by page load requests associated with the initial URL. The shadow browser 428 resolves any identified URLs to their IP addresses by, for example, sending a DNS lookup query message 432 to the ground-based DNS server 416. The shadow browser 428 need not attempt to capture user input or present output. The shadow browser 428 sends a message 434 to the airborne DNS server 414 containing the discovered URLs and their associated IP addresses. The airborne DNS server 414 adds the discovered URLs and their associated IP addresses to its DNS cache 414C. Any actual content produced by the shadow browser 428 may be discarded. Subsequent DNS lookup requests related to the initial URL may now be found in the DNS cache 414C of the airborne DNS server 414, thereby, eliminating the delays associated with sending DNS lookup query messages 422 to the ground-based DNS server 416 and enabling the page(s) to load more quickly. To allow the page to start loading sooner, the shadow browser 428 may send DNS information in multiple messages 434. In some examples, the DNS lookup query message 422 is not sent to the ground-based DNS server 416. Instead, the airborne DNS server 414 waits for DNS information from the shadow browser 428. The shadow browser 428 need not identify all URLs referenced from the initial URL. Any that are identified will obviate associated ground-based DNS lookups.

While an example manner of implementing the communication system 400 to decrease DNS lookup times for airborne clients are illustrated in FIG. 4, one or more of the elements, processes and/or devices illustrated in FIG. 4 may be combined, divided, re-arranged, omitted, eliminated and/ or implemented in any other way. Further, the communication system 400 and/or, more generally, the communication system 400 may include one or more elements, processes or devices in addition to, or instead of, those illustrated in FIG. 4, or may include more than one of any or all of the illustrated elements, processes and devices.

The communication system 400 of FIG. 4 may be implemented by hardware, software, firmware, and/or any combination of hardware, software and/or firmware. Thus, for example, the airborne DNS server 414 and/or the shadow browser 428 of FIG. 4 could be implemented by a computing system such as that shown and discussed below in connection with FIG. 7, one or more analog or digital circuit(s), logic circuits, programmable processor(s), programmable controller(s), GPU(s), DSP(s), ASIC(s), PLD(s), FPGA(s), and/or FPLD(s).

Figure 5:
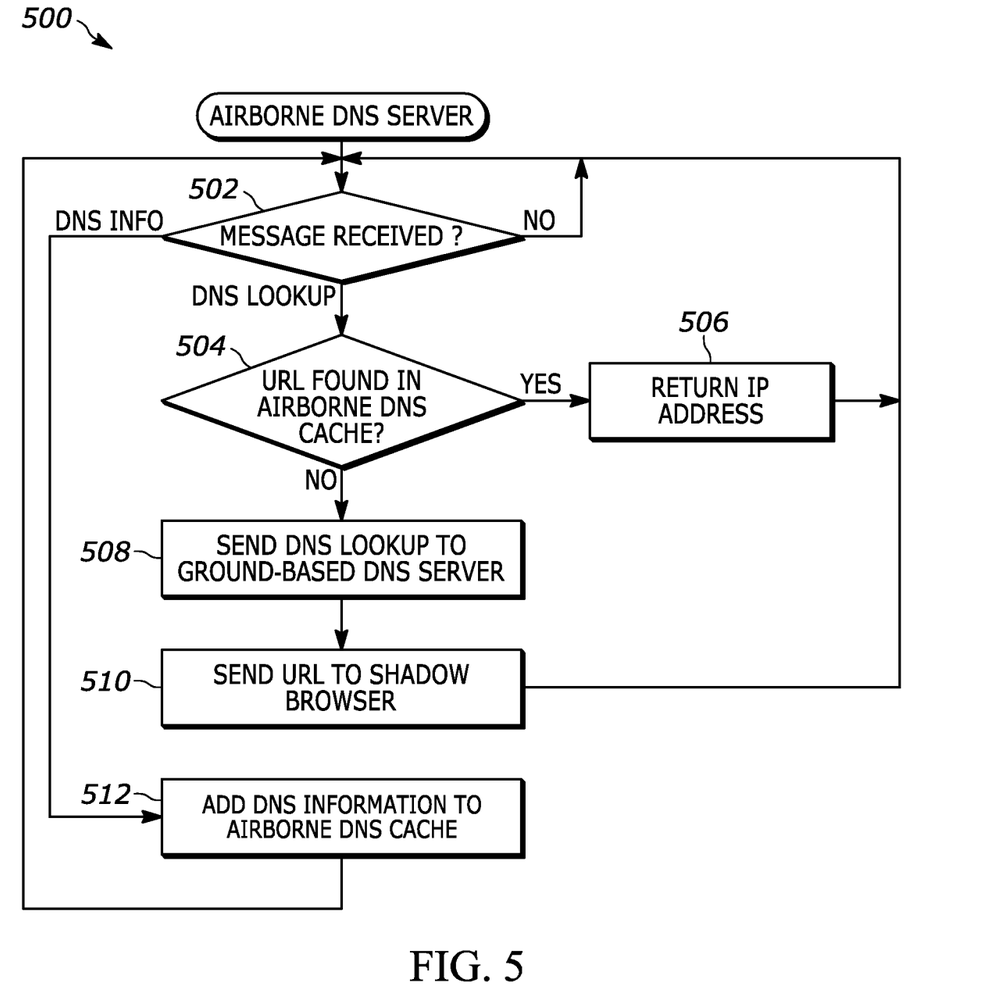
FIG. 5 is a flowchart representative of example methods, logic or instructions for implementing the example airborne DNS server of FIG. 4.

A flowchart 500 representative of example processes, methods, logic, software, computer- or machine-readable instructions for implementing the airborne DNS server 414 is shown in FIG. 5. The processes, methods, logic, software and instructions may be an executable program or portion of an executable program for execution by a processor such as the processor 702 of FIG. 7. The program may be embodied in software or instructions stored on a non-transitory computer- or machine-readable storage device, storage medium and/or storage disk such as those described above in connection with FIG. 2. Further, although the example program is described with reference to the flowchart 500 illustrated in FIG. 5, many other methods of implementing the airborne DNS server 414 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an ASIC, a PLD, an FPGA, an FPLD, a logic circuit, hardware logic, hardware implemented state machines, etc.) structured to perform the corresponding operation without executing software or instructions.

The program of FIG. 5 begins at block 502, where an airborne DNS server 414 waits to receive a DNS lookup query message 418 from a user device 406 (block 502). When a DNS lookup query message 418 is received (block 502), and if the URL indicated in the DNS lookup query message 418 is found in the airborne DNS server's DNS cache 414C (block 504), airborne DNS server 414 sends a DNS lookup response message 420 containing the IP address associated with the URL to the user device 406 (block 506). Control then returns to block 502 to wait for another message.

Returning to block 504, if the URL is not found in the airborne DNS server's DNS cache 414C (block 504), the airborne DNS server 414 sends a DNS lookup query message 422 to the ground-based DNS server 416 (block 508) and sends a message 430 containing the URL to the shadow browser 418 (block 510). Control then returns to block 502 to wait for another message.

Returning to block 502, if a DNS information message 426, 432 is received from the ground-based DNS server 416 or the shadow browser 428 (block 502), the DNS information contained in the DNS information message 426, 432 is stored in the airborne DNS server's DNS cache 414C (block 512). Control then returns to block 502 to wait for another message.

Figure 6:
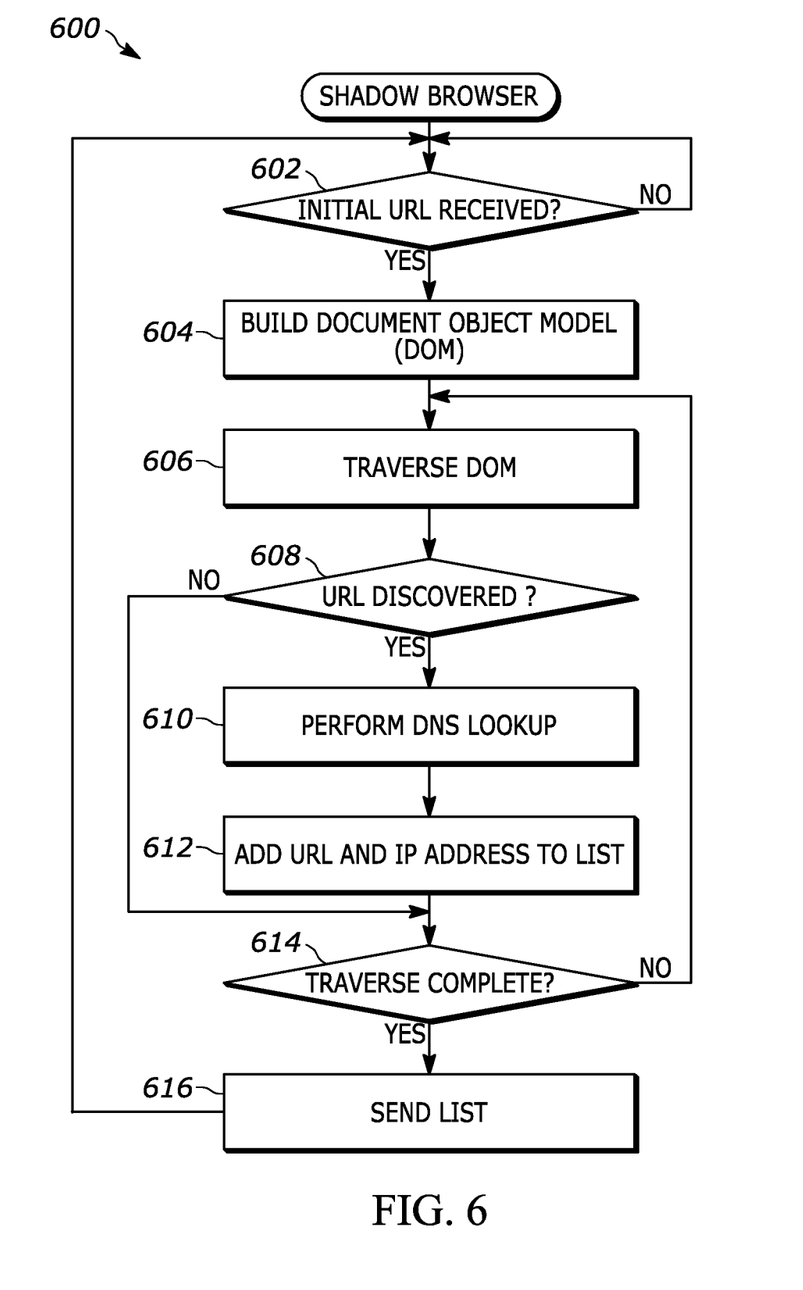
FIG. 6 is a flowchart representative of example methods, logic or instructions for implementing the example shadow browser of FIG. 4.

A flowchart 600 representative of example processes, methods, logic, software, computer- or machine-readable instructions for implementing the shadow browser 428 is shown in FIG. 6. The processes, methods, logic, software and instructions may be an executable program or portion of an executable program for execution by a processor such as the processor 702 of FIG. 7. The program may be embodied in software or instructions stored on a non-transitory computer- or machine-readable storage device, storage medium and/or storage disk such as those described above in connection with FIG. 2. Further, although the example program is described with reference to the flowchart 600 illustrated in FIG. 6, many other methods of implementing the shadow browser 428 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an ASIC, a PLD, an FPGA, an FPLD, a logic circuit, hardware logic, hardware implemented state machines, etc.) structured to perform the corresponding operation without executing software or instructions.

The program of FIG. 6 begins at block 602, where the shadow browser 428 waits to receive an initial URL for a page to be analyzed (block 602). When an initial URL is received (block 602), the shadow browser 428 builds a DOM from the initial URL (block 604). The shadow browser 428 begins traversing the DOM (block 606). As each URL is discovered (block 608), the shadow browser 428 sends a DNS lookup query message for the URL to the ground-based DNS server 416 for an IP address for the URL (block 610) and stores the URL and IP address in a list (block 612). When the DOM has been traversed (block 614), the list of URLs and IP addresses are sent to the user device 406 (block 616) and control returns to block 602 to wait for another URL to process. If traversing of the DOM has not completed (block 614), control returns to block 606 to continue traversing the DOM.

Figure 7:
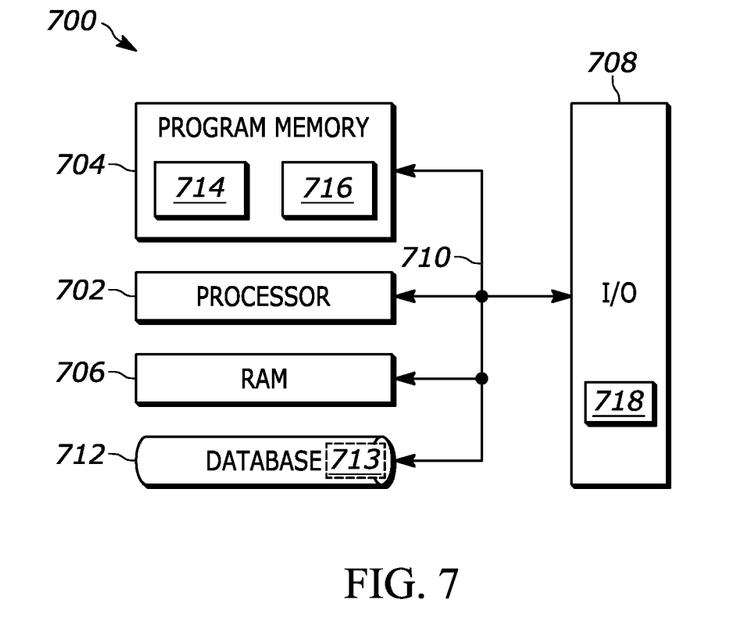
FIG. 7 is a block diagram of an example computing system that can be used to implement the DNS peer engine server or the DNS peer engine client of FIG. 1, and/or the airborne DNS server or the shadow browser of FIG. 4 to decrease DNS lookup times for airborne clients, in accordance with the disclosed embodiments.

Referring now to FIG. 7, a block diagram of an example computing system 700 to improve DNS cache efficiency (e.g., to decrease DNS lookup times), in accordance with described embodiments. The example computing system 700 may be used to, for example, implement all or part of the DPE-S 136, the DPE-Cs 140-142, the airborne DNS server 414, the shadow browser 428 and/or, more generally, the communication systems 100, 400. The computing system 700 may be, for example, a server, a personal computer, a workstation, a laptop computer, or any other type of computing system.

The computing system 700 includes a processor 702, a program memory 704, a RAM 706, and an input/output (I/O) circuit 708, all of which are interconnected via an address/data bus 710. The program memory 704 may store software, and machine- or computer-readable instructions, which may be executed by the processor 702 to implement the DPE-S 136, the DPE-Cs 140-142, the airborne DNS server 414, and the shadow browser 428.

It should be appreciated that although FIG. 7 depicts only one processor 702, the computing system 700 may include multiple processors 702. Moreover, different portions (e.g., the DPE-S 136, the DPE-Cs 140-142, the airborne DNS server 414, and the shadow browser 428) of the example communication systems 100, 400 may be implemented by different computing systems such as the computing system 700. The processor 702 of the illustrated example is hardware, and may be a semiconductor based (e.g., silicon based) device. Example processors 702 include a programmable processor, a programmable controller, a GPU, a DSP, an ASIC, a PLD, an FPGA, an FPLD, etc.

The program memory 704 may include volatile and/or non-volatile memories, for example, one or more RAMs (e.g., a RAM 714) or one or more program memories (e.g., a ROM 716), or a cache (not shown) storing one or more corresponding software, and machine- or computer-instructions. For example, the program memory 704 stores software, and/or machine- or computer-readable instructions that may be executed by the processor 702 to implement any of the DPE-S 136, the DPE-Cs 140-142, the airborne DNS server 414, the shadow browser 428 and/or, more generally, the communication systems 100, 400. Modules, systems, etc. instead of and/or in addition to those shown in FIG. 7 may be implemented. The software, and/or machine- or computer-readable instructions may be stored on separate non-transitory computer- or machine-readable storage devices, storage mediums and/or storage disks, including at different physical locations.

Example memories 704, 714, 716 include any number or type(s) non-transitory computer- or machine-readable storage device, storage medium and/or storage disk such as those described above in connection with FIG. 2

In some embodiments, the processor 702 may also include, or otherwise be communicatively connected to, a database 712 or other data storage mechanism (one or more hard disk drives, optical storage drives, solid state storage devices, CDs, CD-ROMs, DVDs, Blu-ray disks, etc.). In the illustrated example, the database 712 stores a DNS cache 713 that may be used to implement any of the DNS caches 116C-116D, 414C.

Although FIG. 7 depicts the I/O circuit 708 as a single block, the I/O circuit 708 may include a number of different types of I/O circuits or components that enable the processor 702 to communicate with peripheral I/O devices. Example interface circuits 708 include an Ethernet interface, a universal serial bus (USB), a Bluetooth® interface, a near field communication (NFC) interface, and/or a PCI express interface. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.), a navigation device (a mouse, a trackball, a capacitive touch pad, a joystick, etc.), a speaker, a microphone, a printer, a button, a communication interface, an antenna, etc.

The I/O circuit 708 may include a number of different network transceivers 718 that enable the computing system 700 to communicate with another computer system, such as the computing system 700 that implement other portions of the communication systems 100, 400 via, e.g., a network (e.g., the communication network such as The Internet 112, 410). The network transceiver 718 may be a wireless fidelity (Wi-Fi) transceiver, a Bluetooth transceiver, an infrared transceiver, a cellular transceiver, an Ethernet network transceiver, an asynchronous transfer mode (ATM) network transceiver, a digital subscriber line (DSL) modem, a dialup modem, a satellite transceiver, a cable modem, etc.

From the foregoing, it will be appreciated that example methods and apparatus to decrease DNS lookup times for airborne clients have been disclosed. From the foregoing, it will be appreciated that methods and apparatus have been disclosed that enhance the operations of a computer to decrease the time needed to perform DNS lookups. The disclosed methods and apparatus improve the efficiency of using a computing device by decreasing the amount of time for webpages to download and be presented. That is, through use of disclosed aspects of the invention, computers can operate more efficiently by completing webpage loads sooner freeing the computer to do additional tasks. The disclosed methods and apparatus are accordingly directed to one or more improvement(s) in the functioning of a computer.

Example methods and apparatus to decrease DNS lookup times for airborne clients are disclosed herein. Further examples and combinations thereof include at least the following.

Use of "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way, but may also be configured in ways that are not listed.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The embodiments are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification, specific embodiments have been described. However, one of ordinary skill in the art appreciates that various modifications and changes can be made in view of aspects of this disclosure without departing from the scope of the invention as set forth in the claims below. Accordingly, the specification and figures are to be regarded in an illustrative rather than a restrictive sense, and all such modifications made in view of aspects of this disclosure are intended to be included within the scope of present teachings.

Additionally, the benefits, advantages, solutions to problems, and any element(s) that may cause any benefit, advantage, or solution to occur or become more pronounced are not to be construed as a critical, required, or essential features or elements of any or all the claims.

Furthermore, although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A domain name system (DNS) cache peering system, comprising:
   a first DNS cache of a plurality of DNS caches; a first DNS server of a plurality of DNS servers, wherein the first DNS server is associated with the first DNS cache and configured to:
   receive, from a user device, a first DNS lookup request for a first uniform resource locator (URL), and when a first Internet protocol (IP) address for the first URL is not found in the first DNS cache, send a second DNS lookup request for the first IP address for the first URL;
a second DNS server configured to:
receive the second DNS lookup request from the first DNS server,
unicast, in response to the second DNS lookup request, a first DNS lookup response including the first IP address for the first URL to the first DNS server, and
when the first IP address for the first URL is not found in a second DNS cache associated with the second DNS server, query an authoritative name server for the first IP address for the first URL; and
a DNS peer engine server separate from the first DNS server and the second DNS server, the DNS peer engine server configured to:
capture the first DNS lookup response unicast by the second DNS server to the first DNS server, wherein the first DNS lookup response was not sent to the DNS peer engine server by the second DNS server, and
multicast first DNS information from the first DNS lookup response to a plurality of DNS peer engine clients,
wherein each of the plurality of DNS peer engine clients is communicatively coupled to a respective one of the plurality of DNS servers wherein the plurality of DNS peer engine clients act as a proxy for the respective one of the plurality of DNS servers via which the plurality of DNS servers receive the multicast DNS information;
wherein the first DNS server is configured to send, to the user device in response to receiving the first DNS lookup response from the second DNS server, a second DNS lookup response including the first IP address, and
wherein the plurality of DNS peer engine clients are configured to store the first DNS information in respective DNS caches of the plurality of DNS caches.

2. The system of claim 1, wherein:
the second DNS server is configured to:
receive a third DNS lookup request from a third DNS server for a second IP address for a second URL, and
unicast, in response to the third DNS lookup request, a third DNS lookup response to the third DNS server;
the DNS peer engine server is configured to:
capture the unicast third DNS lookup response sent by the second DNS server to the third DNS server, wherein the third DNS lookup response was not sent to the DNS peer engine server by the second DNS server, and
multicast second DNS information from the third DNS lookup response to the plurality of DNS peer engine clients; and
the plurality of DNS peer engine clients are configured to store the second DNS information in the respective DNS caches of the plurality of DNS caches.

3. The system of claim 2, wherein the DNS peer engine server is configured to multicast the first DNS information with the second DNS information.

4. The system of claim 1, wherein the DNS peer engine server is configured to:
capture a plurality of DNS lookup responses during a period of time;
form a message containing DNS information from the captured plurality of DNS lookup responses; and
multicast the message to the plurality of DNS peer engine clients.

5. The system of claim 4, wherein the plurality of DNS lookup responses were sent to a plurality of DNS servers.

6. A computer-implemented method, comprising:
capturing, by one or more processors, a first domain name system (DNS) lookup response unicast from a first DNS server of a plurality of DNS servers to a second DNS server, wherein first DNS information of the first DNS lookup response is obtained by the first DNS server from a DNS cache or an authoritative name server; and
multicast the first DNS information from the first DNS lookup response from a DNS peer engine server separate from the first DNS server and the second DNS server to a plurality of DNS peer engine clients, wherein the plurality of DNS peer engine clients are communicatively coupled to a respective one of the plurality of DNS servers wherein the plurality of DNS peer engine clients act as a proxy for the respective one of the plurality of DNS servers via which the plurality of DNS servers receive the multicast DNS information.

7. The computer-implemented method of claim 6, further comprising:
capturing, by the one or more processors, a second DNS lookup response unicast from the first DNS server to a third DNS server; and
multicasting, by the one or more processors, second DNS information from the second DNS lookup response from the DNS peer engine server to the plurality of DNS peer engine clients.

8. The computer-implemented method of claim 7, wherein the first DNS information is multicast together with the second DNS information.

9. The computer-implemented method of claim 6, further comprising:
capturing, by the one or more processors, a plurality of DNS lookup responses unicast during a period of time; and
multicasting DNS information from the plurality of captured DNS lookup responses together from the DNS peer engine server to the plurality of DNS peer engine clients.

10. The computer-implemented method of claim 9, wherein the plurality of DNS lookup responses were unicast to respective ones of a plurality of DNS servers.

11. A non-transitory computer-readable storage medium comprising instructions that, when executed, cause a machine to:
capture a first domain name system (DNS) lookup response unicast from a first DNS server of a plurality of DNS servers to a second DNS server, wherein first DNS information of the first DNS lookup response is obtained by the first DNS server from a DNS cache or an authoritative name server; and
multicast the first DNS information from the first DNS lookup response from a DNS peer engine server separate from the first DNS server and the second DNS server to a plurality of DNS peer engine clients, wherein the plurality of DNS peer engine clients are communicatively coupled to a respective one of the plurality of DNS servers wherein the plurality of DNS peer engine clients act as a proxy for the respective one of the plurality of DNS servers via which the plurality of DNS servers receive the multicast DNS information.

12. The non-transitory computer-readable storage medium of claim 11, comprising further instructions that, when executed, cause the machine to:

capture a second DNS lookup response unicast from the first DNS server to a third DNS server; and multicast second DNS information from the second DNS lookup response from the DNS peer engine server to the plurality of DNS peer engine clients.

13. The non-transitory computer-readable storage medium of claim 12, comprising further instructions that, when executed, cause the machine to multicast the first DNS information with the second DNS information.

14. The non-transitory computer-readable storage medium of claim 11, comprising further instructions that, when executed, cause the machine to:

capture a plurality of unicast DNS lookup responses during a period of time; and multicast DNS information from the plurality of captured DNS lookup responses together from the DNS peer engine server to the plurality of DNS peer engine clients.

15. The non-transitory computer-readable storage medium of claim 14, wherein the plurality of DNS lookup responses were unicast to respective ones of a plurality of DNS servers.

16. A system, comprising:

a first domain name system (DNS) server having an associated DNS cache, and configured to receive a first DNS lookup request for a uniform resource locator (URL) from a client device executing a web browser;

a second DNS server configured to receive a second DNS lookup request from the first DNS server based on the first DNS lookup request, and send, in response to the second DNS lookup request, a DNS lookup response to the first DNS server; and a shadow browser separate from the first DNS server and the second DNS server, the shadow browser configured to:

receive the URL from the second DNS server in a message separate from the second DNS lookup request, identify additional URLs referenced from the URL, identify, using the second DNS server, Internet Protocol (IP) addresses associated with the additional URLs, and send the additional URLs and the associated IP addresses to the first DNS server, wherein the first DNS server is further configured to add both (i) the DNS lookup response received from the second DNS server and (ii) the additional URLs and the associated IP addresses received from the shadow browser to the DNS cache, and resolve a URL referenced from the additional URLs referenced by the web browser using the DNS cache.

17. The system of claim 16, wherein the shadow browser is configured to identify the additional URLs by traversing and rendering a document object model (DOM) associated with the URL.

18. The system of claim 17, wherein the rendering of the DOM excludes user input.

19. The system of claim 17, wherein the rendering of the DOM includes identifying the additional URLs traversed by a page load request for the URL.

\* \* \* \* \*